Nov. 15, 1938.  O. M. MIKESELL  2,136,978
MOTOR VEHICLE
Filed July 23, 1937  3 Sheets-Sheet 1

O. M. Mikesell,
INVENTOR

BY Victor J. Evans & Co.
ATTORNEYS

Nov. 15, 1938. O. M. MIKESELL 2,136,978
MOTOR VEHICLE
Filed July 23, 1937 3 Sheets-Sheet 2
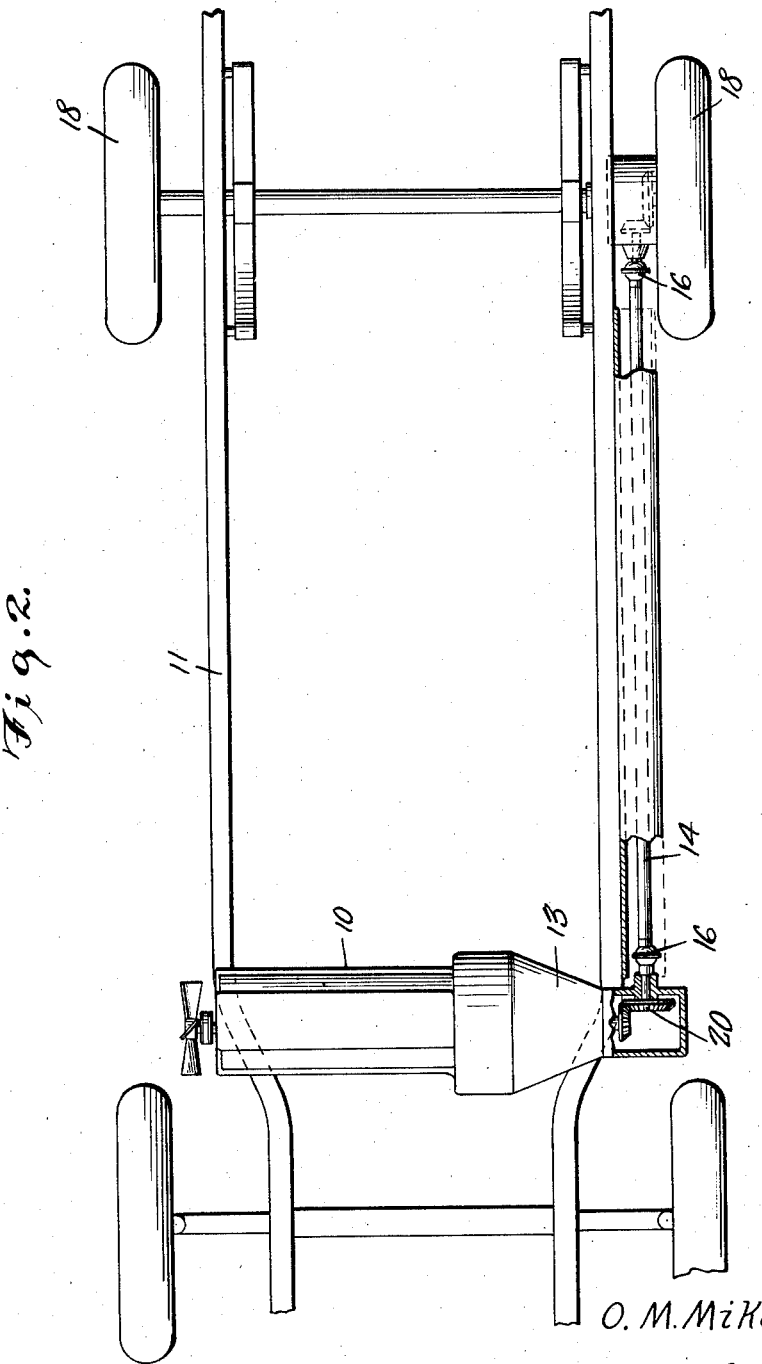
O. M. Mikesell,
INVENTOR
BY Victor J. Evans & Co.
ATTORNEYS

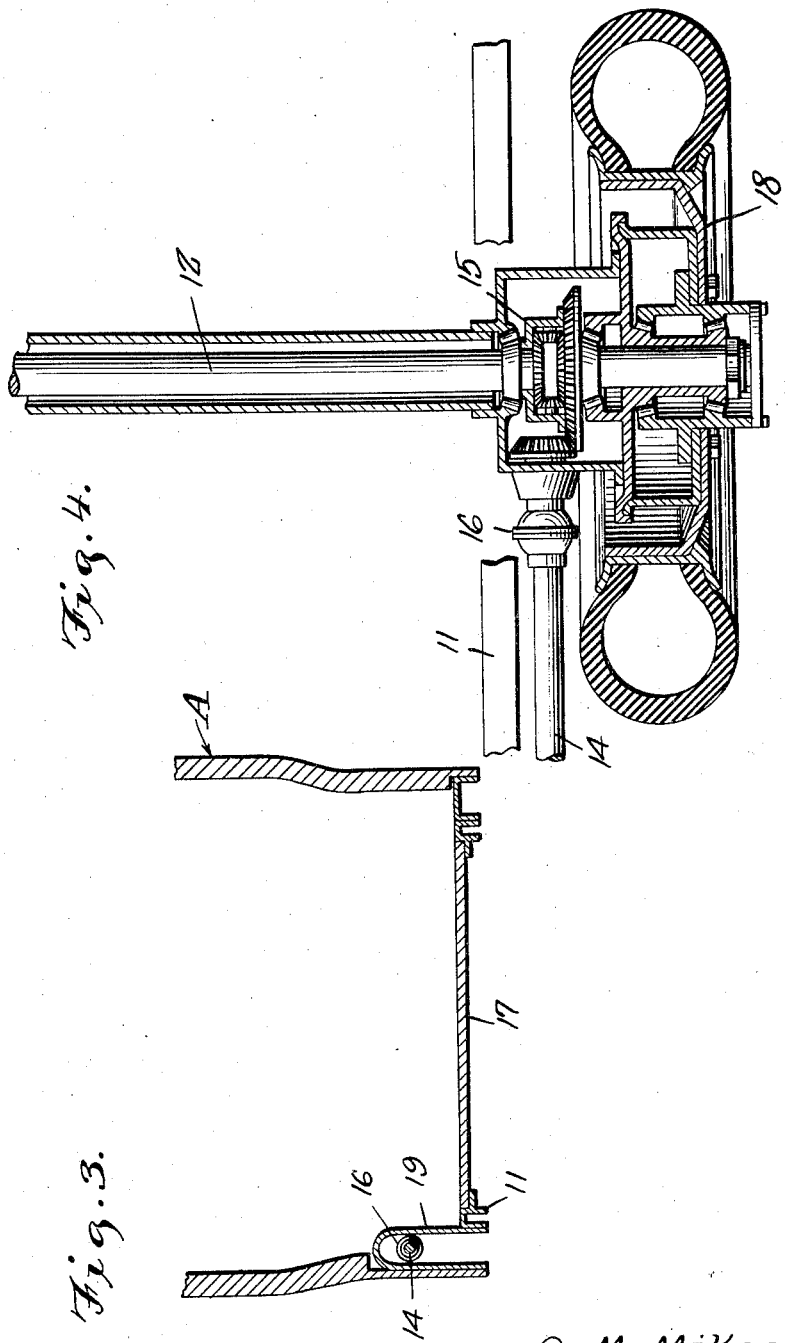

Patented Nov. 15, 1938

2,136,978

UNITED STATES PATENT OFFICE 2,136,978

MOTOR VEHICLE

Omar M. Mikesell, New Paris, Ohio

Application July 23, 1937, Serial No. 155,299

3 Claims. (Cl. 180—54)

The invention relates to a motor vehicle and more especially to power transmission mechanism or driving assembly for automotive vehicles.

The primary object of the invention is the provision of mechanism or assembly of this character, wherein the power unit is arranged crosswise and forwardly of the vehicle while the driving connections between it and the rear wheels of said vehicle are located wholly without the chassis frame and associated body of said vehicle so that the floor level of the latter can be in a plane considerably below the said driving connections and in this way assuring maximum ease and comfort to the occupants of the vehicle, giving a high standard of riding quality as well as affording ample leg room and height of seats without the necessity for lengthening the wheel base or increasing the seating height above the normal.

Another object of the invention is the provision of mechanism or assembly of this character, wherein the floor level in its entirety of the vehicle is at a lower level than heretofore possible or possible with any other type of drive than the arrangement of the driving connections wholly outside of the vehicle and parallel with one side thereof and thus through this arrangement there is avoided side sway of the vehicle and enabling easy access to the body of the same.

A further object of the invention is the provision of mechanism or assembly of this character, wherein the driving connections between the motor of the vehicle and the rear wheels thereof more closely approach the tired area of such wheels, that is to say, one of the rear wheels at one side of the vehicle and in this manner assuring full force and effect in the driving of such vehicle from its power plant.

A further object of the invention is the provision of mechanism or assembly of this character, wherein the placing of the driving connections entirely away from the floor area of the vehicle and at one side of the latter enables easy access to such connections while the power unit is disposed crosswise with respect to the vehicle and in this way assuring a lowered floor level in its entirety within the vehicle.

A still further object of the invention is the provision of mechanism or assembly of this character, which is extremely simple in its construction, thoroughly reliable and effective in operation, increasing safety to the vehicle to eliminate side sway, giving a maximum lowered center of gravity to such vehicle, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 2 is a fragmentary top plan view with the body of the vehicle removed from its chassis and partly in section.

Figure 3 is a fragmentary sectional view taken on the line 3—3 of Figure 1.

Figure 4 is a fragmentary enlarged horizontal sectional view through the differential of such mechanism or assembly.

Similar reference characters indicate corresponding parts throughout the several views in the drawings.

Figure 1:
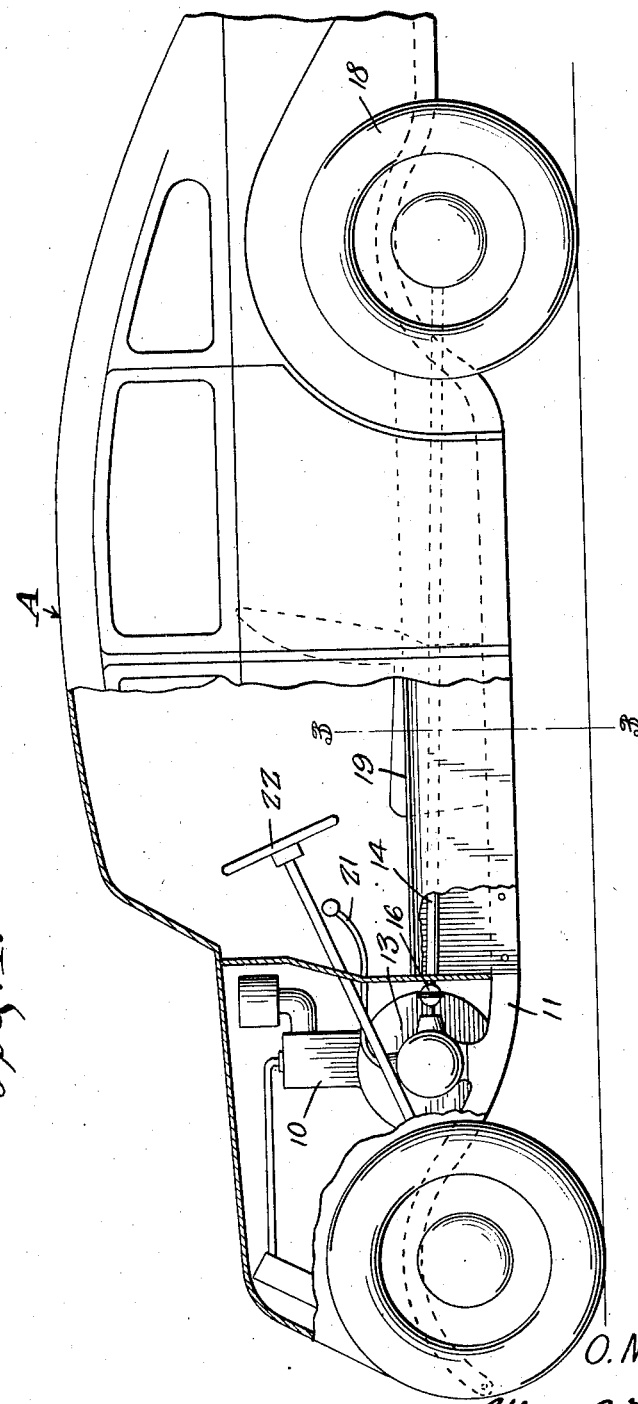
Figure 1 is a side elevation partly in section showing a motor vehicle constructed in accordance with the invention.

In the accompanying drawings, as is customary, motor vehicles have a power plant 10 which is located adjacent to the forward end of the chassis frame 11 and just rearwardly of the front axle, motion being transmitted to the rear axle 12 through a clutch and transmission mechanism (not shown) and within a casing 13, which is usually positioned adjacent the rear end of the power plant 10 and through a propeller shaft 14 and a differential 15, respectively, while in this instance the power plant or engine 10 is disposed transversely or crosswise of the chassis frame 11, being supported at right angles to the line of draft of the vehicle, a portion of the vehicle being indicated generally at A. It is, of course, understood that this power plant or engine 10 may be arranged at a different angle to either side of the right angular lie thereof with relation to the chassis frame and is supported thereon in any desirable manner for the efficiency in the driving of the vehicle.

In this instance the driving shaft 14, which may be of any desirable type including the required number of universal and slip joints, each being indicated at 16, is disposed wholly without the chassis frame 11 at one side exteriorly thereof, preferably the left side, and is arranged parallel with this side of said chassis frame so that the floor level of the vehicle A can be below the plane of the drive shaft 14, the floor of such vehicle being indicated at 17 and in this manner the load of the vehicle is carried as low as possible to prevent side sway of such vehicle and to afford ease and comfort to occupants of the vehicle as well as assuring easy access to the body of the vehicle. This arrangement is also desirable because the seating of the occupants of the vehicle will be such as to carry the load mainly between the front and rear axles, giving easy riding quality and providing ample leg room and height of seats without the necessity of lengthening the wheel base unduly or increasing the seating height above normal. Furthermore, the driving shaft 14 being located wholly outside of the supporting chassis frame 11 of such vehicle assures a maximum lowered arrangement of the floor 17 in its entirety and throughout the foot area of such vehicle.

The differential 15 can be of any desirable construction through which power is transmitted to the driving wheels of the vehicle, the driving wheels being indicated at 18 and in this instance the differential is located directly rearwardly of the drive shaft 14 and outside of the chassis frame 11 being at the left hand side of said vehicle and in line with the disposition of the drive shaft 14 in its association therewith. This disposition of the differential 15 enables a close approach of the driving connections with the tired area of the wheel 18 next thereto.

A suitable casing 19 covers the drive shaft 14 and the same may be built into the vehicle in any desirable manner.

The connections between the power unit or engine 10 and the drive shaft 14 in this instance involve meshing gears 20, these being incased similarly to the differential 15.

The transmission lever is indicated at 21 while the steering wheel is denoted at 22, respectively.

It is, of course, understood that any suitable arrangement of speed reduction through gearing in the transmission mechanism within the casing 13 can be resorted to for the purpose of reducing the speed of the propeller shaft 14, possibly one-half to that of the motor speed. This would eliminate the tendency of whip or out of balance condition of a shaft revolving at too high a rate of speed. Then, more important, a final reduction of speed in the rear axle differential housing can be accomplished with another two to one reduction giving full reduction of motor speed in high gear of about four to one which is conventional with a small ring gear (not shown). Now, by the placement of the motor, clutch and transmission crosswise of the vehicle, the entire power plant being back of front axle and at the same time allowing the driver and all passengers to be moved forward, this effects more room within the vehicle body on a given wheel base or the same room on a shorter wheel base.

What is claimed is:

1. In a motor vehicle having a chassis frame and rear driving wheels, of a power plant disposed crosswise of the chassis frame forwardly of the drive wheels, and driving connections including a differential between the power plant and said driving wheels and being laterally disposed to one side of and located wholly outside of the chassis frame.

2. In a motor vehicle having a chassis frame and rear driving wheels, of a power plant disposed crosswise of the chassis frame forwardly of the drive wheels, and driving connections including a differential between the power plant and said driving wheels and being laterally disposed to one side of and located wholly outside of the chassis frame and parallel to the said chassis frame.

3. In a motor vehicle having a chassis frame and rear driving wheels, of a power plant disposed crosswise of the chassis frame forwardly of the drive wheels, driving connections between the power plant and said driving wheels and being laterally disposed to one side of and located wholly outside of the chassis frame and parallel to the said chassis frame, a differential included with said driving connections and disposed wholly outside of the chassis frame and directly rearwardly of said connections, and a flooring for the vehicle arranged at a level in its entirety considerably below the lie of the said connections.

OMAR M. MIKESELL.